United States Patent [19]

Fujita et al.

[11] Patent Number: 4,774,399
[45] Date of Patent: Sep. 27, 1988

[54] MECHANISM FOR PREVENTING ERRONEOUS MOUNTING AND DISMOUNTING OF MEMORY CARD

[75] Inventors: Kenji Fujita, Shizuoka; Akinobu Murakoshi, Mishima, both of Japan

[73] Assignee: Tokyo Electric Co., Ltd., Tokyo, Japan

[21] Appl. No.: 101,828

[22] Filed: Sep. 28, 1987

[30] Foreign Application Priority Data

Oct. 1, 1986 [JP] Japan ................... 61-233886

[51] Int. Cl.$^4$ ........................... G06K 7/06
[52] U.S. Cl. ......................... 235/441; 235/492
[58] Field of Search ..................... 235/441, 492

[56] References Cited

U.S. PATENT DOCUMENTS 4,717,817 1/1988 Grassl et al. .................... 235/441

FOREIGN PATENT DOCUMENTS 59-165284 9/1984 Japan .

Primary Examiner—Harold I. Pitts
Attorney, Agent, or Firm—Frishauf, Holtz, Goodman & Woodward

[57] ABSTRACT

A mechanism prevents a memory card from erroneous mounting and dismounting on and from an apparatus having a card insertion hole and performing a predetermined processing on memory unit of the card when the card is mounted into the hole to a predetermined position. The mechanism comprises a memory card provided with a recess, and an engagement member movable between a projecting position, at which the member is projected in a locus of movement of the card from an inlet of the hole to the predetermined position, and a retracted position, at which the member is spaced apart from the locus. The engagement member is interlocked with an operation switch for a circuit for performing a predetermined process to the memory unit, so that the member is brought to the projecting position when the switch is turned on and to the retracted position when the switch is turned off.

5 Claims, 6 Drawing Sheets

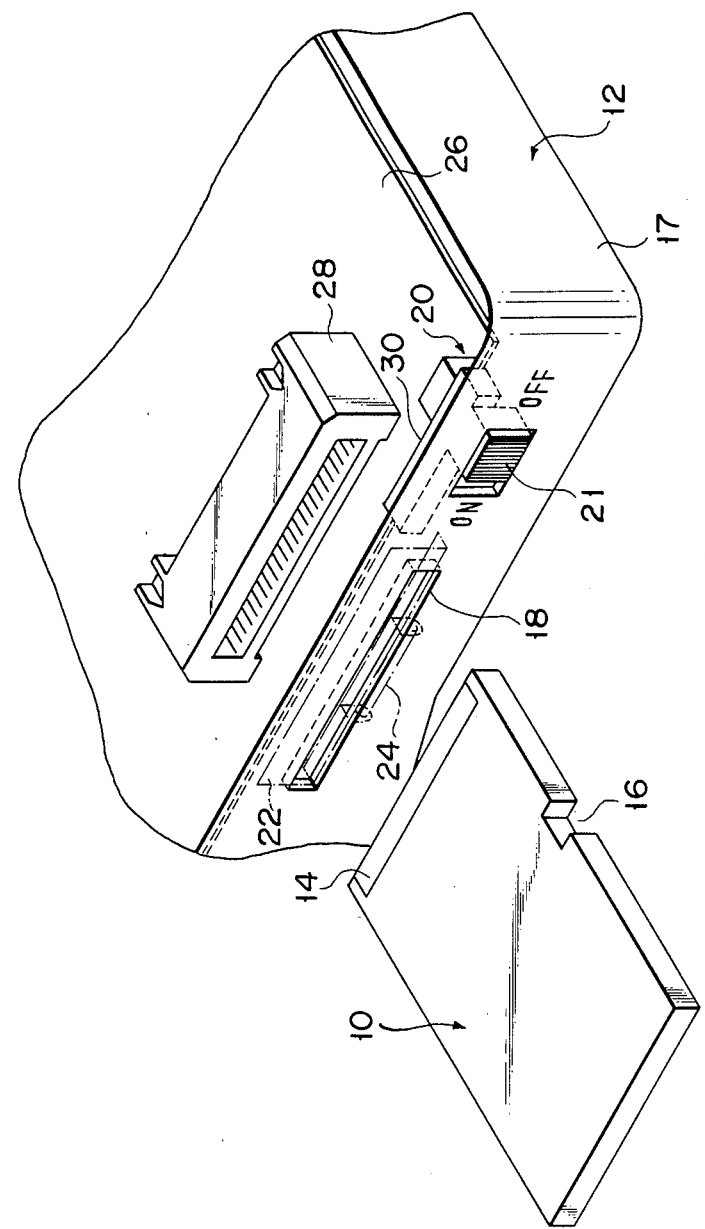
F I G. 2

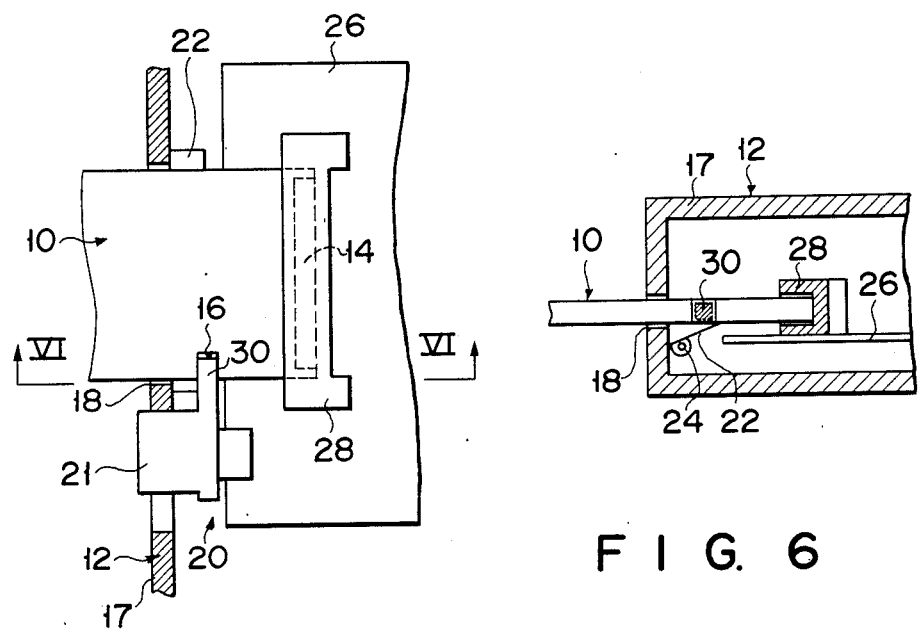
FIG. 5
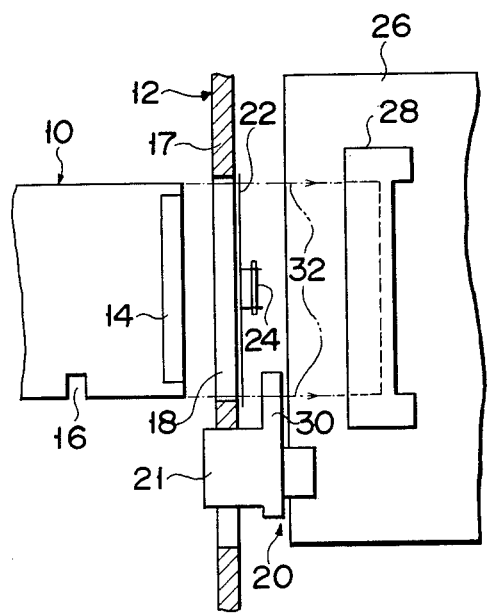
FIG. 6
FIG. 7

MECHANISM FOR PREVENTING ERRONEOUS MOUNTING AND DISMOUNTING OF MEMORY CARD

BACKGROUND OF THE INVENTION

This invention relates to a mechanism for preventing erroneous mounting and dismounting of a memory card on and from an apparatus having a memory card insertion hole, into which a memory card can be detachably inserted, and performing a predetermined processing to memory means of a memory card when the memory card is inserted into the memory card insertion hole to a predetermined position.

Memory cards using ICs as memory means are well known. In anapparatus used with such memory cards, a memory card usually can be detachably mounted.

In the prior art apparatus used with memory cards, however, data in the memory means of a memory card is liable to be destroyed when the memory card is withdrawn by mistake from a memory card insertion hole of the apparatus while the apparatus is performing a processing to the memory means of the memory card.

A mechanism for preventing erroneous mounting and dismounting a memory card is well known, as disclosed in Japanese Patent Disclosure (kokai) No. 59 (1984)-165284. In this mechanism, the surface of a housing of the apparatus used with memory cards is formed with a recess, which has an opening having the same plane area as that of a memory card and can accommodate the memory card. The housing is provided with a cover, which is rotatable between a closing position, at which the cover covers the opening of the recess, and an opening position, at which the cover opens the opening of the recess. On the bottom of the recess a connector to be electrically contacted with contacts of the memory card is provided, and a locking mechanism for holding the cover at its closing position moves a power source switch of the apparatus to its ON and OFF positions. More specifically, the power source switch is turned on when the locking mechanism is operated to hold the cover at its closing position, and is turned off when the locking mechanism is released to turn the cover to its opening position.

The prior art mechanism constructed as described above can surely solve the problems noted above that are caused by erroneously mounting and dismounting of a memory card. However, the memory card accommodation recess, which must have an opening having the same plane area as that of the memory card on the surface of the housing of the apparatus used with memory cards, disturbs compacting of the housing. In addition, operations for opening and closing the cover, which must be done prior to mounting or dismounting a memory card on or from the memory card accommodation recess and is independent of the mounting and dismounting operations of the memory cards, is cumbersome.

SUMMARY OF THE INVENTION

The present invention has been made in consideration of the above situation, and an object of this invention is to provide a mechanism of preventing erroneous mounting and dismounting of a memory card, which can not only surely solve the problems noted above due to erroneous mounting or dismounting of a memory card while the apparatus used with memory cards is performing a processing on memory means of a memory card, but also is compact in structure and easily operable.

The above object of the invention is achieved by a mechanism for preventing erroneous mounting and dismounting of a memory card on and from an apparatus having a memory card insertion hole, into which a memory card can be detachably inserted, and performing a predetermined processing to memory means of a memory card when the memory card is inserted into the memory card insertion hole to a predetermined position, the mechanism comprising a memory card provided with a recess, and an engagement member movable between a projecting position, at which the engagement member is projected in a locus of movement of the memory card from an inlet of the memory card insertion hole of the apparatus to the predetermined position, and a retracted position, at which the engagement member is spaced apart from the locus of movement, the engagement member being interlocked with an operation switch for a circuit for performing a predetermined process to the memory means, so that the engagement member is brought to the projecting position when the operation switch is turned on and to the retracted position when the switch is turned off, wherein the engagement member is moved from the retracted position to the projecting position by turning on the operation switch when the memory card is located on the predetermined position in the memory card insertion hole, at the projecting position the engagement member being engaged with the recess of the memory card so as to prevent the memory card from dismounting from the predetermined position, and is moved from the projecting position to the retracted position by turning off the operation switch while the memory card is located on the predetermined position, at the retracted position the engagement member being released from the engagement with the recess of the memory card so as to allow the memory card to be dismounted from the predetermined position in the memory card insertion hole.

With the mechanism for preventing erroneous mounting and dismounting of a memory card which is according to the present invention and characterized by the above mentioned construction, the engagement member is moved from the retracted position to the projecting position by turning on the operation switch after the memory card is brought to the predetermined position in the apparatus used with memory cards, and is engaged with the recess of the memory card. Engagement member engaged with the recess of the memory card surely prevents the memory card from dismounting from the predetermined position while the memory means of the memory card is under the predetermined processing.

Memory card can be dismounted from the predetermined position only after the movement of the engagement member from the projecting position to the retracted position by turning off the operation switch so that the engagement of the engagement member with the recess of the memory card is released.

With the mechanism for preventing erroneous mounting and dismounting of a memory card which is according to the present invention and characterized by the above mentioned construction, when the operation switch has been turned on at the time of insertion of the memory card into the memory card insertion hole of the apparatus used with memory cards, the engagement member has been projected in the locus of movement of the memory card from the inlet of the memory card insertion hole to the predetermined position noted above, so that the memory card inserted into the memory card insertion hole collides with the engagement member and can not be advanced to the predetermined position.

When the operation switch is turned off at the time of insertion of the memory card into the memory card insertion hole, the engagement member is spaced apart from the locus noted above, so that the memory card inserted into the memory card insertion hole can be advanced to the predetermined position without collision with the engagement member.

Until the memory card inserted into the memory card insertion hole reaches at the predetermined position, even if the operation switch is erroneously operated to be turned on, the movement of the engagement member from the retracted position to the projecting position is prevented by the memory card, so that the operation switch interlocked with the engagement member is not turned on.

This surely prevents destruction of data in the memory means due to erroneous dismounting of the memory card.

The opening of the memory card insertion hole formed on the housing of the apparatus used with memory cards is shaped as a slot having substantially the same height and width as the thickness and width, respectively, of the memory card. This arrangement permits the structure of the housing to be compact in comparison with the prior art, in which an accommodation recess must have an opening having substantially the same plane size as that of the memory card on the surface of the housing of the apparatus used with memory cards.

Further, unlike the prior art described above, there is no need of the opening and closing operation for the cover, which is independent from the mounting and dismounting operations of the memory card, before the operation of mounting or dismounting the memory card in and from the memory card insertion hole of the apparatus used with memory cards. Thus, the memory card can be readily mounted and dismounted in and from the memory card insertion hole of the apparatus.

In the mechanism for preventing erroneous mounting and dismounting of a memory card according to the invention and characterized by the structure as noted above, it is preferable that the recess mounted on the memory card is a notch or depression formed in an edge of the memory card extending in the direction of movement of the memory card in the apparatus. Such a notch or depression can be readily formed and never reduces the mechanical strength of the memory card.

Further, in the mechanism for preventing erroneous mounting and dismounting of a memory card according to the invention and characterized by the above structure, the recess may be a through hole formed on the memory card.

Where the apparatus used with memory cards is provided with cover means movable between a closing position to close the inlet of a memory card insertion hole and an opening position to open the same inlet in order to prevent troubles of the apparatus due to instruction of dust and objects other than the memory card into the inlet of the memory card insertion hole, it is preferable that the cover means is constructed such that it is moved from the closing position to the opening position by the insertion of a memory card into the memory card insertion hole and is moved from the opening position to the closing position by the dismounting of the memory card from the memory card insertion hole.

The cover means which is opened and closed by the mounting and dismounting of a memory card in and from the memory card insertion hole, never spoils the readiness of mounting and dismounting of the memory card in and from the memory card insertion hole.

Where the apparatus used with memory cards has the cover means as noted above, the cover means can be combined with an engagement member such that the engagement member located in its projecting position projects in the locus of movement of the cover means from the closing position to the opening position to prevent movement of the cover means from the closing position to the opening position and, in its retracted position, is far away from the locus of movement of the cover means from the closing position to the opening position to permit movement of the cover means from the closing position to the opening position.

BRIEF DESCRIPTION OF THE DRAWINGS

FIG. 2 is a schematic perspective view showing a main parts of the inside of the apparatus used with IC cards shown in FIG. 1;

FIG. 5 is a schematic plan view similar to FIG. 3 but showing the first embodiment in a state that an operation switch of the apparatus used with IC cards is turned on after an IC card inserted into an IC card insertion hole of the apparatus has been brought to a predetermined position in the apparatus, and an engagement member interlocked with the operation switch is located at an projecting position and is engaged with a notch formed in the IC card;

FIG. 6 is a schematic sectional view taken along line VI—VI in FIG. 5;

FIG. 7 is a schematic plan view similar to FIG. 3 but showing the first embodiment in a state that the operation switch of the apparatus used with IC cards is turned on before the insertion of the IC card into the IC card insertion hole of the apparatus, and the engagement member located at the projecting position by interlocking with the operation switch projects not only in the locus of movement of the IC card in the apparatus but also in the locus of rotation of a cover for the IC card insertion hole;

Now, some preferred embodiments and modifications of the invention will be described with reference to the accompanying drawings.

DESCRIPTION OF THE PREFERRED EMBODIMENTS

Figure 1:
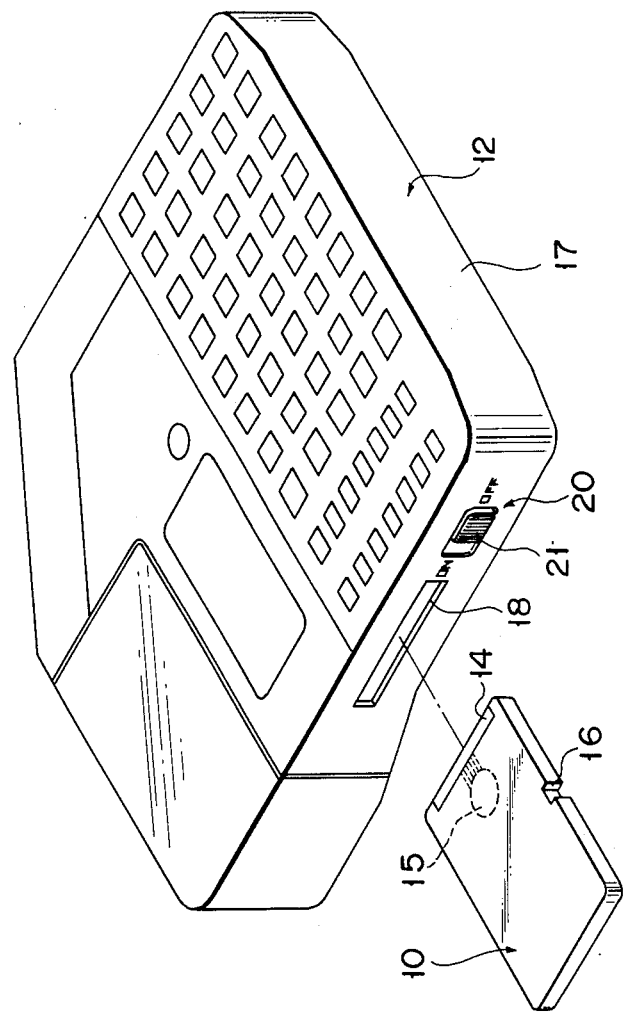
FIG. 1 is a schematic perspective view showing an IC card and an apparatus used with IC cards, to which a first embodiment of the mechanism for preventing erroneous mounting and dismounting of a memory card according to the invention is applied.

FIG. 1 shows IC card 10 as a kind of memory card and apparatus 12 used with IC card 10, IC card 10 and apparatus 12 constituting a first embodiment of the mechanism for preventing erroneous mounting and dismounting of a memory card according to the invention.

IC card 10 has power source terminals and electric signal input/output terminals for IC 15 provided as memory means in the body of IC card 10. These terminals are provided in end portion 14 of IC card 10, from which card 10 is inserted into apparatus 12. IC card 10 also has notch 16 formed in one of both longitudinally extended edges.

Apparatus 12 has housing 17, one side wall of which has IC card insertion hole 18 shaped like a slot and extending substantially in the horizontal direction. In the side of IC card insertion hole 18 there is provided slide type operation switch 20 for a circuit (accommodated in housing 17), which performs a predetermined processing on IC 15 of IC card 10 when IC card 10 is inserted through IC card insertion hole 18 to a predetermined position. In this embodiment, slide switch 20 is a power source switch for the circuit noted above. Slide switch 20 has operating portion 21, which is exposed on the side wall noted above and is slidable in the longitudinal direction of IC card insertion hole 18 between an "on" position close to IC card insertion hole 18 and an "off" position away from hole 18.

FIG. 2 schematically shows, in an enlarged scale, a main parts of the inner side of apparatus 12 used with IC cards.

Inside housing 17 of apparatus 12, cover 22 is provided on the inner side of IC card insertion hole 18. Cover 22 is rotatably supported on shaft 24, which is located under IC card insertion hole 18 so as to extend in the longitudinal direction of insertion hole 18, and it can be turned around shaft 24 between a closing position to close IC card insertion hole 18 and an opening position to open hole 18. Cover 22 is urged by urging means (not shown) to be held at the closing position.

In housing 17 of apparatus 12 is also accommodated printed circuit board 26, on which the circuit noted above is formed. Connector 28 is secured to the upper surface of printed circuit board 26. It is electrically connected to various terminals of insertion end portion 14 of IC card 10 when the IC card is inserted into IC card insertion hole 18 and is reached at a predetermined position. It is further electrically connected to the circuit noted above on printed circuit board 26.

Operating portion 21 of slide type switch 20 has engagement portion or member 30, which extends toward IC card insertion hole 18 in housing 17. As shown particularly in FIG. 4, engagement portion 30 is at the same level as IC card insertion hole 18. Further, as best shown in FIG. 3, when operating portion 21 of slide switch 20 is located at the "off" position away from IC card insertion hole 18, engagement portion 30 is far away from locus 32 (as shown by two-dot chain lines in FIG. 3) of movement of IC card 10 in housing 17 from the entrance of IC card insertion hole 18 to connector 28 disposed at the predetermined position noted above and also away from the locus of movement of cover 22 from the closing position (shown in FIG. 3) to the opening position.

The position of engagement portion 30 at this time is referred to as retracted position of engagement portion 30.

Figure 4:
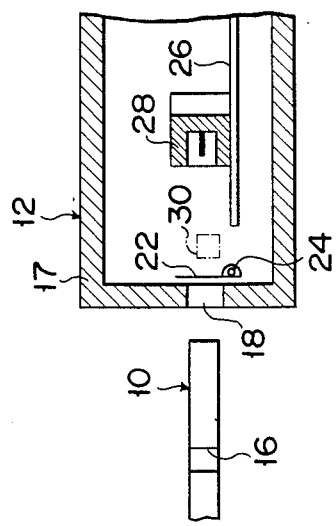
FIG. 4 is a schematic sectional view taken along line IV—IV in FIG. 3.
Figure 3:
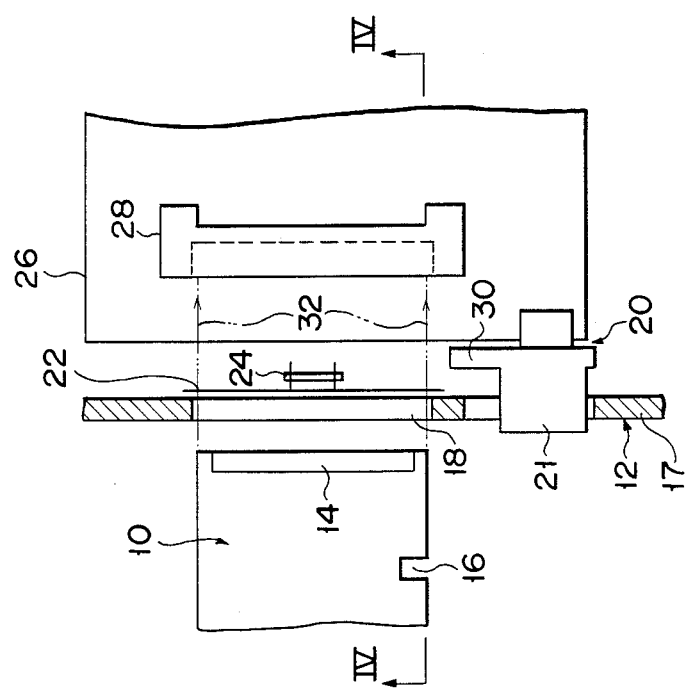
FIG. 3 is a schematic plan view showing the main parts of the inside of the apparatus schematically shown in FIG. 2.

As shown in FIGS. 2 to 4, in a case that IC card 10 is inserted into IC card insertion hole 18 with insertion side end 14 taking lead when operating portion 21 of slide type switch 20 is located at the "on" position, cover 22 which is pushed by insertion side end portion 14 of IC card 10 is rotated from the closing position shown in FIG. 3 to the opening position against the urging force of urging means (not shown). The movement of IC card 10 in apparatus 12 is stopped when insertion side end portion 14 of IC card 10 is connected to connector 28, i.e., when IC card 10 is brought to a predetermined position in apparatus 12.

When operating portion 21 of slide type switch 20 is operated to move itself toward the "on" position before IC card 10 inserted into IC card insertion hole 18 is brought to the predetermined position in apparatus 12, engagement portion 30 is brought into contact with the longitudinal edge of IC card 10 on which notch 16 is formed, whereby the movement of operating portion 21 to the "on" position is prevented.

When insertion side end portion 14 of IC card 10 is connected to connector 28, that is, when IC card 10 is brought to a predetermined position in apparatus 12, notch 16 of IC card 10 is located on the locus of movement of engagement portion 30 that is caused with the movement of operating portion 21 of slide type switch 20 from the "off" position to the "on" position. Thus, by causing movement of operating portion 21 at this time from the "off" position to the "on" position, the engagement portion 30 is moved from the retracted position shown in FIG. 3 to be engaged with notch 16 of IC card 10, as shown in FIGS. 5 and 6.

The position of engagement portion 30 at this time is referred to as projecting position.

While the operating portion 21 is located at the "on" position, the circuit on the printed circuit board 26 performs a predetermined processing to IC 15 of IC card 10 through connector 28 and insertion side end portion 14 of IC card 10 connected to connector 28.

If it is intended to remove IC card 10 from IC card insertion hole 18 while operating portion 21 is located at the "on" position, i.e., while the circuit on printed circuit board 26 is performing a predetermined processing to IC 15 of IC card 10, this is surely prevented by engagement portion 30 engaged with notch 16 of IC card 10. This means that it is possible to surely prevent destruction of data in IC 15 of IC card 10 due to erroneous dismounting thereof.

To remove or dismount IC card 10 from IC card insertion hole 18, engagement portion 30 has to be detached from notch 16 of IC card 10 by moving engagement portion 30 from the "on" position as shown in FIG. 5 to the "off" position.

When insertion side end portion 14 of IC card 10 having been separated from connector 28 is detached from IC card insertion hole 18, cover 22 is turned from the opening position shown in FIGS. 5 and 6 to the closing position shown in FIGS. 3 and 4 by urging force of urging means (not shown).

In a case that operating portion 21 of switch 20 is brought to the "on" position when insertion side end portion 14 of IC card 10 is not inserted in IC card insertion hole 18, engagement portion 30 is brought to the projecting position, as shown in FIG. 7. In this state, engagement portion 30 is projected in locus 32 of movement of IC card 10 in housing 17 and also in the locus of movement of cover 22 (shown in FIG. 5) from the closing position to the opening position.

If it is intended at this time to insert insertion side end portion 14 of IC card 10 into IC card insertion hole 18, this is prevented because cover 22 urged by insertion side end portion 14 of IC card 10 collides with engagement portion 30 and can not be turned up to the opening position.

Now, a second embodiment of the invention will be explained with reference to FIGS. 8 to 10.

Parts of this embodiment like those in the first embodiment of the invention having been described with reference to FIGS. 1 to 7 are designated by the same reference numerals and are not described in detail.

Figure 8:
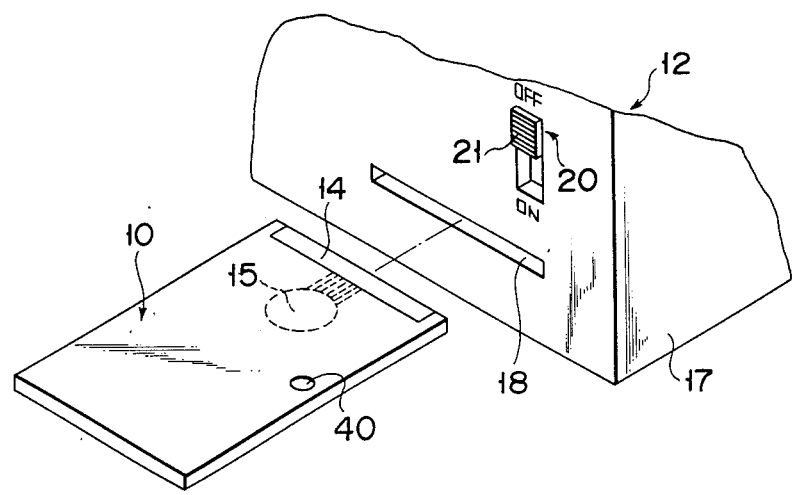
FIG. 8 is a schematic fragmentary perspective view showing an IC card and an apparatus used with IC cards, to which a second embodiment of the mechanism for preventing erroneous mounting and dismounting of a memory card according to the invention is applied.

In the second embodiment, as shown particularly in FIG. 8, IC card 10 has through hole 40 which is formed in lieu of notch 16. Further, in this embodiment operating portion 21 of slide type switch 20 for the circuit of printed circuit board 26 is provided on housing 17 so as to be movable between an "on" position close to IC card insertion hole 18 and an "off" position away from IC card insertion hole 18 in a direction substantially perpendicular to the longitudinal direction of IC card insertion hole 18.

Operating portion 21 has engagement portion 30, which extends in the direction of movement of operating portion 21 such that it can approach locus 32 of movement of IC card 10. When operating portion 21 is at the "off" position, engagement portion 30 is spaced apart from locus 32 and also spaced apart from the locus of rotation of cover 22, as best shown in FIG. 9. Thus, IC card 10 inserted into IC card insertion hole 18 with insertion side end portion 14 taking lead can be moved to a predetermined position, at which the insertion side end portion 14 of IC card 10 is connected to connector 28.

The position of engagement portion 30 at this time is a retracted position thereof.

Figure 10:
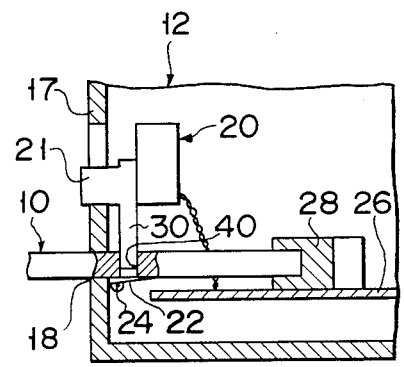
FIG. 10 is a schematic plan view similar to FIG. 9 showing the second embodiment in a state that an operation switch of the apparatus is turned on after an IC card inserted into an IC card insertion hole of the apparatus has been brought to a predetermined position, and an engagement member located at an projecting position by the interlocking with the operation switch engages with a through hole of the IC card.
Figure 11:
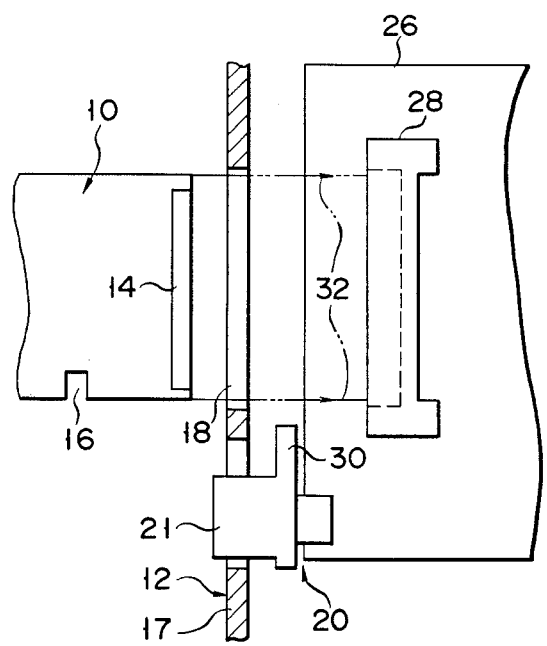
FIG. 11 is a schematic plan view similar to FIG. 3 showing a modification of the first embodiment of the present invention, the first embodiment being shown in FIGS. 1 to 7, wherein a cover for the IC card insertion hole of the apparatus is not provided.
Figure 12:
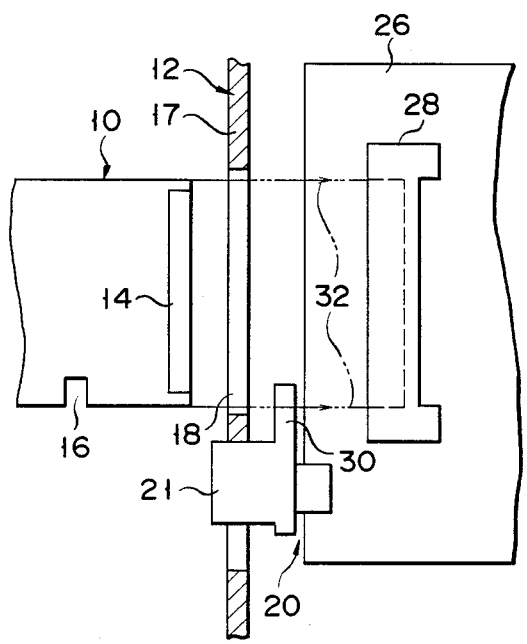
FIG. 12 is a schematic plan view similar to FIG. 1 showing the modification shown in FIG. 11, wherein the engagement member is located at the projecting position by turning on the operating switch so that the engagement member prevents the memory card from locating at the predetermined position in the IC card insertion hole.

When operating portion 21 is moved from the "off" position to the "on" position after IC card 10 is brought to the predetermined position noted above in housing 17, engagement portion 30 is inserted into through hole 40 in IC card 10, as shown in FIG. 10.

This position of engagement portion 30 is a projecting position thereof.

In a case that operating portion 21 is moved from the "off" position to the "on" position when IC card 10 is not inserted in IC card insertion hole 18, engagement portion 30 is moved from the retracted position to the projecting position to project in locus 32 and also in the locus of rotation of cover 22.

In this embodiment, the technical advantages of engagement portion 30 at the retracted position and projecting position are entirely the same as the technical advantages of engagement portion 30 in the first embodiment of the invention at the retracted position and projecting position.

The above described embodiments described above are given for the sake of illustration only and are not limit the scope of this invention, and various changes and modifications are possible without departing from the scope and spirit of the invention.

For example, in the first embodiment shown in FIGS. 1 to 7, it is possible to provide operating portion 21 and engagement portion 30 of slide type switch 20 such that they are movable in a direction substantially perpendicular to the longitudinal direction of IC card insertion hole 16 as in the second embodiment.

Further, in the first embodiment of the invention, it is possible to arrange such that operating portion 21 of slide type switch 20 is movable in the longitudinal direction of IC card insertion hole 16 and only engagement portion 30 is movable in a direction substantially perpendicular to the longitudinal direction of IC card insertion hole 16. In this case, a mechanism for converting a movement in horizontal direction into movement in vertical direction is provided between operating portion 21 and engagement portion 30 of slide type switch 20.

Figure 9:
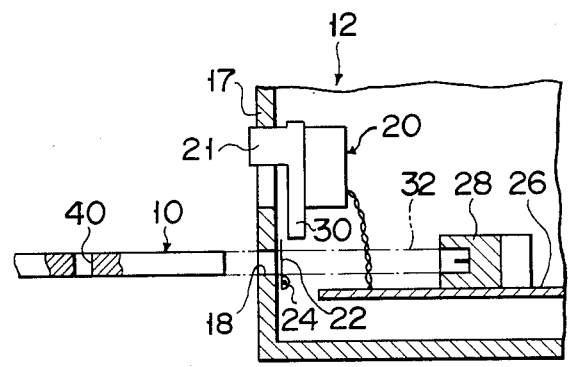
FIG. 9 is a schematic fragmentary sectional view showing the IC card and apparatus used with IC cards shown in FIG. 8.

Likewise, in the second embodiment of the invention shown in FIGS. 8 to 10, it is possible to arrange such that only operating portion 21 of slide type switch 20 is movable in the longitudinal direction of IC card insertion hole 16 while engagement portion 30 is movable in a direction substantially perpendicular to the longitudinal direction of IC card insertion hole 16 as in the second embodiment.

What is claimed is:

1. A mechanism for preventing erroneous mounting and dismounting of a memory card on and from an apparatus having a memory card insertion hole, into which a memory card can be detachably inserted, and performing a predetermined processing to memory means of a memory card when the memory card is inserted into said memory card insertion hole to a predetermined position, said mechanism comprising:
   a memory card provided with a recess; and
   an engagement member movable between a projecting position, at which said engagement member is projected in a locus of movement of the memory card from an inlet of said memory card insertion hole of said apparatus to said predetermined position, and a retracted position, at which said engagement member is spaced apart from said locus of movement, said engagement member being interlocked with an operation switch for a circuit for performing a predetermined process to said memory means, so that said engagement member is brought to said projecting position when said operation switch is turned on and to said retracted position when said switch is turned off;
   wherein said engagement member is moved from the retracted position to the projecting position by turning on the operation switch when said memory card is located on the predetermined position in the memory card insertion hole, at the projecting position the engagement member being engaged with the recess of said memory card so as to prevent said memory card from dismounting from the predetermined position, and is moved from the projecting position to the retracted position by turning off the operation switch while said memory card is located on the predetermined position, at the retracted position the engagement member being released from the engagement with the recess of said memory card so as to allow said memory card to be dismounted from the predetermined position in the memory card insertion hole.

2. The mechanism for preventing erroneous mounting and dismounting of a memory card according to claim 1, wherein said engagement member is movable between the projecting position and the retracted position by the movement of the operation switch between the ON and OFF positions even if said memory card is not inserted into the memory card insertion hole of the apparatus, said engagement member located on the projecting position collides with said memory card, which is inserted into the memory card insertion hole of the apparatus while the operation switch is turned on, so as to prevent said memory card from locating on the predetermined position, and said engagement member located on the retracted position allows said memory card, which is inserted into the memory card insertion hole of the apparatus while the operation switch is turned off, to be located on the predetermined position.

3. The mechanism for preventing erroneous mounting and dismounting of a memory card according to claim 1, wherein said recess provided in the memory card is a notch or a depression formed in an edge of the memory card extending in the direction of movement of the memory card in said apparatus.

4. The mechanism for preventing erroneous mounting and dismounting of a memory card according to claim 1, wherein said recess provided in the memory card is a through hole formed in the memory card.

5. The mechanism for preventing erroneous mounting and dismounting of a memory card according to claim 1, wherein:

said apparatus used with said memory card includes cover means capable of being moved between a closing position to close the inlet of said memory card insertion hole and an opening position to open the inlet of said memory card insertion hole, said cover means being moved from said closing position to said opening position with the insertion of a memory card into said memory card insertion hole and moved from said opening position to said closing position with the dismounting of the memory card from said memory card insertion hole; and said engagement member is projected into the locus of movement of said cover means from the closing position to the opening position to prevent movement of said cover means from the closing position to the opening position when said engagement member is located in its projecting position, and is moved away from the locus of said cover means from the closing position to the opening position to permit movement of said cover means from the closing position to the opening position when said engagement member is located in its retracted position.

* * * * *